United States Patent [19]

Spicuzza, Jr. et al.

[11] 4,168,347

[45] Sep. 18, 1979

[54] FIRE AND HEAT RESISTANT STRUCTURES

[75] Inventors: John P. Spicuzza, Jr., Mount Lebanon; Robert J. Boyle, New Galilee, both of Pa.

[73] Assignee: Arco Polymers, Inc., Philadelphia, Pa.

[21] Appl. No.: 866,728

[22] Filed: Jan. 3, 1978

[51] Int. Cl.² .......................... C09K 3/28; E04B 1/94; B32B 31/28
[52] U.S. Cl. ................................. 428/532; 156/272; 427/42; 427/45; 428/411; 428/913; 428/921
[58] Field of Search ............... 156/272; 428/921, 913, 428/411, 532; 427/42, 45

[56] References Cited

U.S. PATENT DOCUMENTS

| 2,881,088 | 4/1959 | Schalenburg | 428/921 X |
|---|---|---|---|
| 2,912,393 | 11/1959 | Stilbert et al. | 428/920 X |
| 3,312,565 | 4/1967 | Rayner et al. | 428/921 X |
| 3,824,200 | 7/1974 | Matalon | 260/2.5 R |
| 3,884,742 | 5/1975 | Roberts | 156/272 X |
| 3,914,513 | 10/1975 | Brown et al. | 428/425 |
| 3,934,066 | 1/1976 | Murch | 428/248 |
| 3,954,537 | 5/1976 | Alfter et al. | 156/272 X |
| 3,973,074 | 8/1976 | de Lissa et al. | 428/921 X |
| 4,104,433 | 8/1978 | Kirk et al. | 428/921 X |

*Primary Examiner*—Harold Ansher
*Attorney, Agent, or Firm*—Hubert E. Evans

[57] ABSTRACT

Fire and heat resistant structures made by the use of fire retardant compositions of the type involving the reaction of phosphoric acid and a reducing sugar are rendered insensitive to moisture by heat curing using high frequency electric current during the production of the fire and heat resistance structures.

9 Claims, No Drawings

FIRE AND HEAT RESISTANT STRUCTURES

BACKGROUND OF THE INVENTION

Significant improvements in producing fire and heat resistant structures have been made by the use of intumescent fire retardant compositions involving the chemical reaction of phosphoric acid and a reducing sugar with the possible addition of one or more additives to increase the intumescent action. Compositions of this general type are disclosed in the patent application of Dr. Ralph Matalon, Ser. No. 755,596, filed Dec. 30, 1976 now abandoned. This application relates to resinous intumescent compositions having high fire and heat resistant properties, which were useful in producing fire and heat resistant structures. However, some compositions of this type were found to have the disadvantage that when used in the making of fire resistant panel structures, laminated or otherwise, the problem of moisture sensitivity over a time period or in an especially humid environment limited the use of such structures when exposed to highly humid conditions. It was thus required in some instances where exposure to humid conditions existed that the board structures had to be sealed in some fashion against the humidity or other provisions made to increase usefulness under all types of exposure. The present invention deals with the solution to this problem.

SUMMARY OF THE INVENTION

Fire unstable materials having associated therewith or coated thereon a fire retardant composition containing the reaction product of phosphoric acid and a reducing sugar can be rendered insensitive to humid conditions by subjecting them to a field of high frequency electric current, commonly known as RF heating. Preferred fire retardant compositions are intumescent and have the property of initiating intumescence at relatively low temperatures, such as, below about 100° C.

DETAILED DESCRIPTION OF THE INVENTION

The present invention relates to improvements in fire and heat resistant structures and especially those with highly effective properties to such an extent that the resultant structure may best be described as flameproof and/or fireproof. Such structures comprise fire unstable materials associated with fire and heat retardant compositions that have outstanding ability to withstand exposure to heat and flame conditions over a prolonged time period.

Intumescent fire retardant compositions are preferable for accomplishing a desired high degree of flame and fireproofness. As used herein, an intumescent composition is one which upon exposure to heat and/or flame will, at a given temperature, soften and then produce a voluminous foam which provides an insulating barrier or zone protecting the fire unstable material from the effects of heat and flame. Upon continued exposure to flame and/or heat, the intumescent foam may turn from its normal cream, brown, tan, or orange color to a black carbonaceous char. The intumescent foam and char are of a relatively light density but have great integrity and strength and continue to function as insulation for the fire unstable materials, even though they may possess a high degree of flammability, as in the case of many synthetic plastic materials.

Preferred fire retardant compositions for use in the present invention are the resinous reaction products of phosphoric acid and a reducing sugar, to which may be added if desired at least one substance providing increased intumescence. Compositions of this type can provide intumescence at significantly lower temperatures such as below 100° C., and thus provide earlier and long lasting protection.

While a number of fire retardant compositions may be used to illustrate the present invention, a particularly suitable composition is being selected because of its highly effective properties. This composition involves the resinous reaction product of a resin forming substance (designated as RF71) and a hardener substance (designated as 175F). The resin forming substance comprises the following approximate weights of ingredients: 3% water, 41% phosphoric acid (85% strength, it being understood that the strength of the acid used is dependent upon the water that may exist elsewhere in the formulation and the strength or amount of acid may be adjusted to compensate), dextrose 56%.

It is generally desirable to increase the intumescent properties of the resin former in its intended fire resistant use by the addition of at least one substance having the property of evolving gas especially under the influence of heat. Examples of such substances are monoammonium phosphate, oxalic acid, urea, monoethanolamine, and the like. Illustrative of a resin former having such additives is that identified as RF77, comprising the following proportions by weight: about 3% water, about 31% phosphoric acid (85% strength), about 43% dextrose, about 8% monoammonium phosphate, about 4% oxalic acid, about 10% urea, and about 1% monoethanolamine.

The resin former substances may be prepared by charging the water and phosphoric acid to a kettle and heating the same to about 70°-90° C. The reducing sugar is added and the mixture agitated for about 10 to 15 minutes. Any additional additives to provide increased intumescence in the final product are added and agitated. The kettle is closed, heated to about 120° C. for about 10 minutes, allowed to cool, and the contents discharged.

A suitable hardener or curing agent may comprise the following ingredients by weight: water about 4%, dextrose about 35%, urea about 28%, sodium hydroxide (3% strength) about 3%, furfuryl alcohol about 5% and paraformaldehyde about 25%. The following procedure is illustrative of the method of making the hardening agent. The sodium hydroxide, water, furfuryl alcohol and paraformaldehyde are charged to a reactor and mixed until dissolved at a temperature of approximately 90° C. The dextrose is added and mixed until a homogenous solution is formed. The mixture is cooled or allowed to cool to about 40° C., followed by addition of the urea and monoethanolamine. This results in an exothermic action and it is desired that the mixture be allowed to heat, but not to rise above the temperature of about 110° C., with the reactor closed. The mixture is held for about 25 minutes, allowed to cool and discharged. Alternatively, the water and dextrose may be charged to the kettle, heated and mixed until they are dissolved at about 90° C. The urea is charged and stirred until dissolved. The kettle is allowed to cool or is cooled by heat transfer to about 60° C., at which time the sodium hydroxide, furfuryl alcohol and paraformaldehyde are added. The kettle is closed, heated to about 110° C. and stirred while maintaining the temperature for about 25 minutes. As the temperature cools, the monoethanolamine may be added and stirred. When the mixture is cooled, it is then ready for use.

The resin former and hardener are mixed together in a preferred ratio of about 1 to 1; however, this ratio may be varied, with the approximate range of resin former to hardener being about 3 to 1 to about 1 to 4 depending upon the physical properties or function desired in the resultant composition. The end product is a thick viscous liquid having a density of about 1½ grams per cubic centimeter.

The fire unstable materials with which the present invention is useful comprise almost any type of material that is considered flammable. Paper, cardboard, wood, and other cellulosic materials are examples of such fire unstable materials. The category fire unstable materials also includes synthetic plastic materials such as polymeric materials, foamed polymeric materials, and the like, which are generally readily flammable. Almost any other material that, upon exposure to fire and heat, is subject to degradation, burning, loss of dimensional stability, etc. is considered a fire unstable material.

When associated with or coated with an effective fire retardant composition, such fire unstable materials can provide a fire resistant structure having a surprising degree of resistance to exposure by fire and/or heat. Structures of this type have great utility for construction purposes as walls, sheeting, partitions, doors, etc. They may also be used to make counter tops, furniture, or other products where high resistance to flame and heat are necessary or desirable.

It has been found that the use of fire resistant structures comprising the fire unstable materials and the previously described fire retardant compositions can be greatly improved if the fire unstable materials and the fire retardant composition are subjected to electronic heating, i.e. a field of high frequency alternating electric current. The use of this type of electric current, commonly known as RF heating, is well known. The essence of the present invention involves the discovery that this type of high frequency heating will provide a high insensitivity of the fireproof structure to conditions of higher than normal humidity. This is in contrast with other types of heat used to cure the fire unstable material and fire retardant composition, such as the use of ambient heat over a long time period or convection or radiation heat as may be encountered in an oven.

Two types of high frequency heating units were used in testing fire resistant structures made in accordance with the present invention. One of these units is described as Model 34A-LH, a thermal electronic heat generator obtained from W. T. LaRose and Associates, Inc., of Troy, N.Y. This unit has a power output of 5 kilowatts and operates at a frequency of approximately 70 megacycles per second. The unit comprises essentially three sections: a power supply section, a high frequency generating section, and a control section. Alternating current, usually a low voltage, is fed to the power supply section wherein it is rectified and transformed to a high voltage current. The high voltage current enters the high frequency generating section where an oscillator circuit together with a power tube generates the high frequency power. The control section consists essentially of start/stop circuits, a timer, overload relay switches and a safety interlock assembly. The high frequency field is generated between two electrodes which may be adjustably spaced to accompany articles to be heated thereby.

The other unit used was a platen press obtained from the Votator Division of Chemetron Corporation, Louisville, Ky. Such presses are used in the manufacture of pressed board or particle board. In this case a 6½ kilowatt power output was available with a frequency of 6 megacycles per second.

Also useful, especially for laboratory testing of samples of fire resistant structures, is the electronic heat produced by an ordinary domestic type microwave oven.

The following examples are intended to illustrate and point out the features of the present invention, but not by way of limitation.

Examples I through IV relate to various types of laminated structures using fire unstable materials.

EXAMPLE I

One type of sample used in this Example comprised a laminate of four ½ inch layers of expandable polystyrene molded foam board. At the interface between each strata of the lamination, two coatings of the fire retardant composition were used with an intervening layer of kraft paper. The resinous fire retardant composition had good adhesive properties to securely adhere the laminates together. On the exterior surfaces of the laminate, there was applied a coating of the resinous fire retardant composition a layer of kraft paper, a second layer of the fire retardant composition. One exterior surface of the laminate had applied thereto, as a facing, a layer of 0.3 mil aluminum foil.

Other samples were prepared by using laminates of molded polystyrene foam board with coatings of the fire retardant compositions at the interface of the laminates and on each of the outer surfaces of the laminate. These samples were faced with aluminum foil.

The resinous composition was a mixture of resin former and hardener, in some cases using a ratio of one part resin former to one part hardener, and in other cases one part resin former to two parts hardener.

Some samples were cured at ambient temperature at a period exceeding seven days. Other samples were cured in an oven providing heat at 220° F. for five minutes. Other samples were cured for 6 hours at 60° F.

In all cases when these samples were subjected to a 100% humidity atmosphere in a closed storage container, they showed signs of disassociation or separation of the laminates after exposure for a period of 72 hours.

EXAMPLE II

In this Example, the samples comprised laminates of boards of molded foam polystyrene adhered together by a coating of the resinous fire retardant composition. Each of the outer surfaces of the laminates was covered with another coating of the fireproof composition, and faced with aluminum foil.

Sample A was cured in a convection oven for 6 hours at 60° C., followed by 8 hours of curing at 65° C. The sample showed signs of disassociation upon exposure to a 100% relative humidity atmosphere in a closed container for 72 hours.

Sample B constructed in the same fashion was cured by a 10 second exposure in a standard domestic type microwave oven. There were no signs of any disassociation after exposure to the 100% relative humidity atmosphere for 144 hours.

EXAMPLE III

The laminated samples in this Example comprised 2 layers of ½" expanded polystyrene molded foam board with an intervening 1" thick board of molded foam polystyrene. The interfacing surfaces and the exterior surfaces of the molded foam polystyrene boards were coated with the resinous fire retardant composition using resin former RF71 and hardener 175F in a ratio of one part resin former to two parts hardener. The samples were faced with aluminum foil.

Samples of Series A were cured at ambient temperature for a period in excess of seven days. Upon 72 hours exposure to the 100% relative humidity in a closed container there were signs of disassociation.

Samples of Series B were subjected to radio frequency curing. Upon exposure to the 100% relative humidity conditions, no disassociation was noted after 1,104 hours of exposure.

EXAMPLE IV

This Example used samples similar to those disclosed in Example III. The fire retardant composition used resin former RF77 and hardener 175F, using ratios of one part resin former to two parts hardener. When samples of the above type were given an ambient cure over a period longer than seven days they showed signs of disassociation after exposure for 72 hours in the 100% relative humidity closed cabinet.

Additional similar samples were treated using high frequency alternating current by the use of the above-described commercial platen press. After a cure time of between about 5 to 10 seconds, some of the samples showed no signs of disassociation after exposure in the 100% relative humidity atmosphere for over 600 hours. Other samples were exposed for a longer time, and showed no signs of disassociation after exposure to the 100% relative humidity atmosphere for 1,150 hours.

EXAMPLE V

In this illustration samples were made by forming a composite board comprising pre-expanded polystyrene particles mixed with the resinous fire retardant composition, which involved ratios of resin former to hardener of two to one and one to one. The polystyrene particles and composition were thoroughly mixed and placed in a non-conductive mold to form a board structure.

Samples which were provided with an ambient cure of over seven days duration did show disassociation of the composite board upon exposure to the 100% relative humidity atmosphere for 72 hours.

Samples of the composite board treated with high frequency alternating current did not show any signs of disassociation after exposure to the 100% relative humidity atmosphere after respectively 1000 hours, 600 hours, and 984 hours.

It is not known why the use of ambient curing and/or curing by convection or radiation heat produced samples which had sensitivity to high humidity nor why the samples treated with the electronic heating did not exhibit such sensitivity.

In all cases the laminated and composite fire resistant structures, fire resistant composition described in the present invention in association with foam polystyrene molded boards or pre-expanded foam polystyrene particles did exhibit resistance to flame and heat exposure to a very marked degree. After exposure to the flame and heat the fire resistant structures exhibited intumescent properties at relatively low temperatures which produced insulating foam which served to insulate and form a barrier against the destructive action of the fire and heat on the polystyrene fire unstable materials. For example, an untreated foam polystyrene board failed when exposed to a burn through flame test in 10 seconds. By contrast, a fire resistant structure like those herein described was able to withstand the burn through flame test for over an hour without destruction.

We claim:

1. An article of manufacture that is high resistant to flame and heat upon exposure thereto over a prolonged time which comprises:
    (a) a fire unstable material,
    (b) an intumescent fire retardant composition associated with said fire unstable material containing the reaction product of phosphoric acid and a reducing sugar,
    (c) said article having been subjected to the passage of electric waves of high frequency alternating current therethrough,
    whereby said article has a high moisture resistance being capable of withstanding continuous exposure to a high humidity atmosphere for a prolonged time period without deterioration or disassociation.

2. A structure as claimed in claim 1 in which said fire retardant composition is intumescent.

3. A structure as claimed in claim 1 in which said fire retardant composition contains at least one additive to increase its intumescent activity at low temperatures.

4. A structure as claimed in claim 1 in which said fire retardant composition is intumescent at a temperature below about 100° C.

5. A structure as claimed in claim 1 in which said fire unstable material is a polymeric material.

6. The method of producing a highly fire and heat resistant structure which comprises associating a fire unstable material with an intumescent fire retardant composition, said fire retardant composition containing the reaction product of phosphoric acid and a reducing sugar, and exposing said associated material and composition to electrical waves having a high frequency, whereby said structure has a high moisture resistance being capable of withstanding continuous exposure to a high humidity atmosphere for a prolonged time period without deterioration or disassociation.

7. The method as claimed in claim 6 in which said fire retardant composition is intumescent at a temperature below about 100° C.

8. The method as claimed in claim 6 in which said fire unstable material is a polymeric material.

9. The method as claimed in claim 6 in which said fire unstable material is foam polystyrene.

* * * * *